United States Patent
Lammert et al.

(10) Patent No.: US 9,900,524 B2
(45) Date of Patent: Feb. 20, 2018

(54) CAMERAS WITH ON-BOARD REPORTING CAPABILITIES

(75) Inventors: Brent Lammert, Wilmington, NC (US); Phil Pollard, Bolingbrook, IL (US)

(73) Assignee: FLIR Systems, Inc., Wilsonville, OR (US)

( * ) Notice: Subject to any disclaimer, the term of this patent is extended or adjusted under 35 U.S.C. 154(b) by 963 days.

(21) Appl. No.: 13/517,424

(22) PCT Filed: Dec. 22, 2010

(86) PCT No.: PCT/US2010/061841
§ 371 (c)(1),
(2), (4) Date: Aug. 17, 2012

(87) PCT Pub. No.: WO2011/079208
PCT Pub. Date: Jun. 30, 2011

(65) Prior Publication Data
US 2012/0314084 A1  Dec. 13, 2012

Related U.S. Application Data (60) Provisional application No. 61/290,124, filed on Dec. 24, 2009.

(51) Int. Cl.
*G06K 9/36* (2006.01)
*H04N 5/33* (2006.01)
(Continued)

(52) U.S. Cl.
CPC .................. *H04N 5/33* (2013.01); *G01J 5/02* (2013.01); *G01J 5/025* (2013.01); *G01J 5/027* (2013.01);
(Continued)

(58) Field of Classification Search
CPC .............................. G01J 5/0265; G06T 11/60
See application file for complete search history.

(56) References Cited

U.S. PATENT DOCUMENTS 3,868,508 A  2/1975  Lloyd
4,999,614 A  3/1991  Ueda et al.
(Continued)

FOREIGN PATENT DOCUMENTS

DE  3200008  7/1983
EP  0 318 039  5/1989
(Continued)

OTHER PUBLICATIONS

Dr. Richard Salisbury, "Thermal Imaging and Predictive Maintenance: What the Future has in Store", IEEE/PCA 42$^{nd}$ Cement Industry Technical Conference, Salt Lake City, Utah, May 2000, pp. 277-287.

*Primary Examiner* — Joseph Ustaris
*Assistant Examiner* — Rebecca Volentine
(74) *Attorney, Agent, or Firm* — Haynes and Boone, LLP (57) ABSTRACT

Described herein is an IR camera that can prepare a report on-board the camera in a standard file format that is substantially universally readable by a number of receiving devices, including but not limited to computers. The report preferably includes at least one IR image, at least one visual image and a table that can be populated with the output of any of the camera's measurement functions or any parametric information (time, date, emissivity, background temperature, GPS location, etc.). The report may also include text, voice, and/or visual/graphical comments and recommendations. The comments may be added directly to the report or hyperlinked to the report.

20 Claims, 7 Drawing Sheets

(51) Int. Cl.
  *G01J 5/02* (2006.01)
  *G01J 5/08* (2006.01)
  *H04N 1/00* (2006.01)
  *H04N 101/00* (2006.01)

(52) U.S. Cl.
  CPC ............ *G01J 5/0265* (2013.01); *G01J 5/0275* (2013.01); *G01J 5/08* (2013.01); *G01J 5/0846* (2013.01); *H04N 1/00204* (2013.01); *H04N 2101/00* (2013.01); *H04N 2201/3253* (2013.01); *H04N 2201/3261* (2013.01); *H04N 2201/3264* (2013.01); *H04N 2201/3266* (2013.01)

(56) References Cited

U.S. PATENT DOCUMENTS

| | | | | |
|---|---|---|---|---|
| 5,321,172 | A | 6/1994 | Sawyer | |
| 5,386,117 | A * | 1/1995 | Piety et al. | 250/330 |
| 5,637,871 | A * | 6/1997 | Piety | G01J 5/02 |
| | | | | 250/330 |
| 6,009,340 | A | 12/1999 | Hsia | |
| 6,028,625 | A | 2/2000 | Cannon | |
| 6,335,722 | B1 * | 1/2002 | Tani | G05B 23/0216 |
| | | | | 345/173 |
| 6,355,922 | B1 | 3/2002 | Lo et al. | |
| 6,496,594 | B1 | 12/2002 | Prokoski | |
| 7,454,050 | B2 * | 11/2008 | Garvey | 382/141 |
| 7,693,679 | B1 * | 4/2010 | Warnke | G01J 5/02 |
| | | | | 116/207 |
| 7,732,768 | B1 * | 6/2010 | Haigh | G01J 5/02 |
| | | | | 250/330 |
| 7,847,251 | B1 * | 12/2010 | Praly | 250/330 |
| 8,148,687 | B1 * | 4/2012 | Praly | G01N 25/72 |
| | | | | 250/330 |
| 8,300,981 | B1 * | 10/2012 | Praly et al. | 382/284 |
| 8,339,457 | B1 * | 12/2012 | Heinke | H04N 5/33 |
| | | | | 250/330 |
| 2001/0045463 | A1 | 11/2001 | Madding et al. | |
| 2004/0245467 | A1 | 12/2004 | Lannestedt | |
| 2004/0264542 | A1 * | 12/2004 | Kienitz | G01J 5/02 |
| | | | | 374/120 |
| 2006/0017821 | A1 * | 1/2006 | Garvey, III | H04N 5/77 |
| | | | | 348/231.3 |
| 2006/0212452 | A1 | 9/2006 | Cornacchia, III | |
| 2006/0249679 | A1 * | 11/2006 | Johnson | G01C 3/08 |
| | | | | 250/332 |
| 2006/0289768 | A1 * | 12/2006 | Vallese | G01J 5/02 |
| | | | | 250/353 |
| 2007/0087311 | A1 * | 4/2007 | Garvey, III | G01J 5/00 |
| | | | | 434/21 |
| 2007/0167830 | A1 * | 7/2007 | Huang | G01J 5/02 |
| | | | | 600/473 |
| 2008/0077019 | A1 * | 3/2008 | Xiao | A61B 5/01 |
| | | | | 600/474 |
| 2009/0172591 | A1 * | 7/2009 | Pomper | G01J 5/02 |
| | | | | 715/810 |
| 2010/0114597 | A1 * | 5/2010 | Shreiber et al. | 705/2 |

FOREIGN PATENT DOCUMENTS

| | | |
|---|---|---|
| JP | 11 057856 | 3/1999 |
| JP | 11 161874 | 9/2002 |
| WO | WO 2003/074982 | 9/2003 |
| WO | WO 2003/098551 | 11/2003 |
| WO | WO 2005/062273 | 7/2005 |
| WO | WO 2011/079208 | 6/2011 |

* cited by examiner

CAMERAS WITH ON-BOARD REPORTING CAPABILITIES

CROSS-REFERENCE TO RELATED PATENT APPLICATION

This patent application claims priority to and the benefit of PCT Patent Application No. PCT/US2010/061841, filed Dec. 22, 2010, which claims priority to and the benefit of U.S. Provisional Patent Application No. 61/290,124, filed Dec. 24, 2009, both of which are incorporated herein by reference in their entirety.

FIELD OF THE INVENTION

This invention generally relates to cameras that have the capacity of preparing reports including images, data and/or analysis on-board without a computing device or similar input/output, processing devices. More specifically, the present invention relates to infrared cameras that can produce reports on-board that include infrared image(s), visual image(s), data measured by the cameras, parametric data, analysis and text/voice/visual comments from the camera operator.

BACKGROUND OF THE INVENTION

Infrared cameras capture thermal images of objects, such as boilers, electrical and mechanical machines, buildings and homes, etc., in order to identify the hot spots in the thermal scenes. Hot spots may indicate malfunctions in machineries or heat losses in buildings and homes. Generally, a camera operator surveys a thermal scene and may take pictures of a scene using an infrared sensor to provide temperature measurements and/or a CCD (charge-coupled device) or CMOS (complementary metal-oxide semiconductor) image sensor to provide a digital visual image of the scene. The camera may also measure other properties of the scene, such as humidity, speed of air flows, etc., and parametric information, such as date, time, GPS coordinates, emissivity value, and background temperature.

The camera operator typically would prepare a report for the customer who had ordered the thermal survey. The operator has to download the IR and visual images and other data to a computer, which must have special driver software and other specialized hardware and software to import the images and data to prepare a report to be presented to the customer. This process can be time consuming and the delivery to the customer is typically delayed. Furthermore, the delay may cause the operator to forget observations about the thermal scene and to omit them from the later-prepared report. The camera operator may carry a portable computer to the survey sites to prepare the report. However, this can be cumbersome and certain survey sites may be inhospitable to the operation of portable computing devices. Furthermore, the portable computer must be pre-loaded with the software specially designed for the particular IR camera being used for that survey.

Certain IR cameras, such as the T-Series IR cameras from FLIR Systems, Inc., on the market today have the capability to store voice comments from the camera operator and associate the voice comments with certain thermal images. The T-Series cameras can also store text comments input directly into the camera through a touch screen or from predetermined list of commonly used texts. The T-Series, particularly the T400 camera, also allows the operator to add free-hand sketches directly on the thermal or visual images and to store the sketches. Additionally, FLIR's i-Series IR cameras can display the thermal image and the visual image in "picture-in-picture" format. The i-Series can also display images as a thumbnail gallery, allowing the operator to view multiple images simultaneously or to conveniently view stored images. The other FLIR IR cameras also have similar capabilities discussed above.

There remains a need in the art and in the industry for a camera that can prepare a report to the customer on-board after a survey of a thermal scene.

SUMMARY OF THE INVENTION

The invention is directed to a camera, preferably an IR camera that can prepare a report on-board the camera in a standard file format that is substantially universally readable by a number of receiving devices, including but not limited to computers. The report is preferably prepared by a pre-selected or standard template, which includes at least one IR image, at least one visual image and a table that can be populated with the output of any of the camera's measurement functions or any parametric information (time, date, emissivity, background temperature, GPS location, etc.). The report may also include text, voice, and/or visual/graphical comments. The comments may be added directly to the report or hyperlinked to the report. The template can also be user-defined.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Embodiments of the present invention are directed to an IR camera that includes at least one pre-selected or standard report template, which includes one or more IR images, one or more visual images and one or more tables that can be populated with the output of any of the camera's measurement functions or any the parametric information, including are not limited to time, date, emissivity value, background temperature value, etc. The table may also include text, voice, or visual comments. Text comments can be added with the camera's pull down menus or information embedded in the image, or with a touch screen keyboard. Voice comments can be added with a microphone and a digital storage medium. Visual comments can be hand sketches made by the camera operator or the thermographer, or video recording of the thermographer using the visual camera, which is preferably built into the IR camera.

In one aspect of the present invention, the thermography report is prepared on-board the IR camera using the predetermined report template(s) and the images, data and information discussed in the preceding paragraph and is output in a standard format that is common to all personal computers (PC) or Macintosh computers (Mac) without requiring any special software. Suitable standard file formats include but are not limited to JNG, JPEG, JPEG2000, JFIF, PNG, HTML, PDF (Adobe), TIFF, word processing formats such as Word, WordPerfect or TXT, any of the spreadsheet formats such as Excel or Lotus 1-2-3, and PowerPoint format etc. Other suitable but non limiting standard file formats are discussed on-line at http://www.magicdb.org/stdfiles.html, which is incorporated by reference herein in its entirety.

Optional user definable report templates can be prepared separately on a computer or other medium and pre-loaded to the inventive camera. Alternatively, the camera can lead the thermographer through a series of options and the thermographer's selections are used to create a user defined report on-board the inventive camera.

The inventive camera may support a universal serial bus (USB, USB 2.0 or higher and collectively "USB") drive or connection, and the standard file format file would load together with any separate, linked text, audio or image files, such as comments, onto the USB drive. The report after being prepared on-board the IR camera can be sent via the USB connection to a facsimile machine, to a flash drive to be written to a memory stick or the like, to a CD/DVD drive and preferably a mini CD/DVD drive to be written on to a disk, to a PC or Mac computer, or to a smart phone such as an iPhone or a Blackberry device to be emailed to the customer, among other forms of data transmission. Alternative, instead of transmitting the report via a USB drive, the inventive camera can send the report to the aforementioned devices wirelessly, for example via a WiFi connection, a Bluetooth connection or radio frequency (RF) connection. Preferably, the customer receives the report wirelessly or through a memory stick, CD/DVD or via email at the customer's computer and print the report to an attached or dedicated printer. Advantageously, since the report is prepared on-board in a standard file format, none of the receiving device needs any specialized software or driver program in order to read the report. The present invention is not limited to any specific data transmission mode or any device that receives the prepared report.

Alternatively, the report can also be sent wirelessly or via a USB connection to a printer when the IR camera carries the most common printer driver software. The report can also be stored on camera 10, and preferably stored within the camera's processor.

Figure 1:
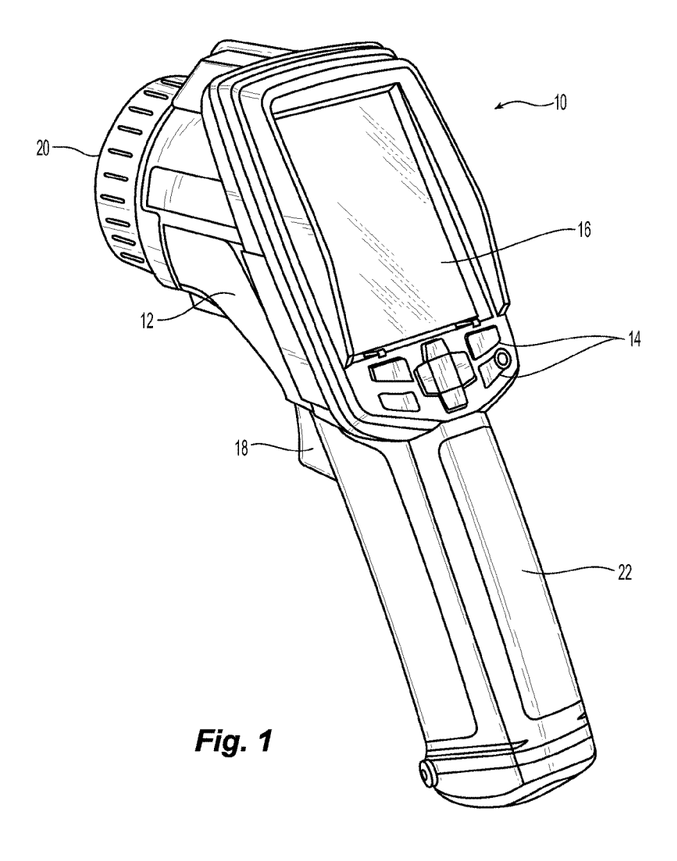
FIG. 1 is a perspective view of an IR camera usable with the present invention.
Figure 2:
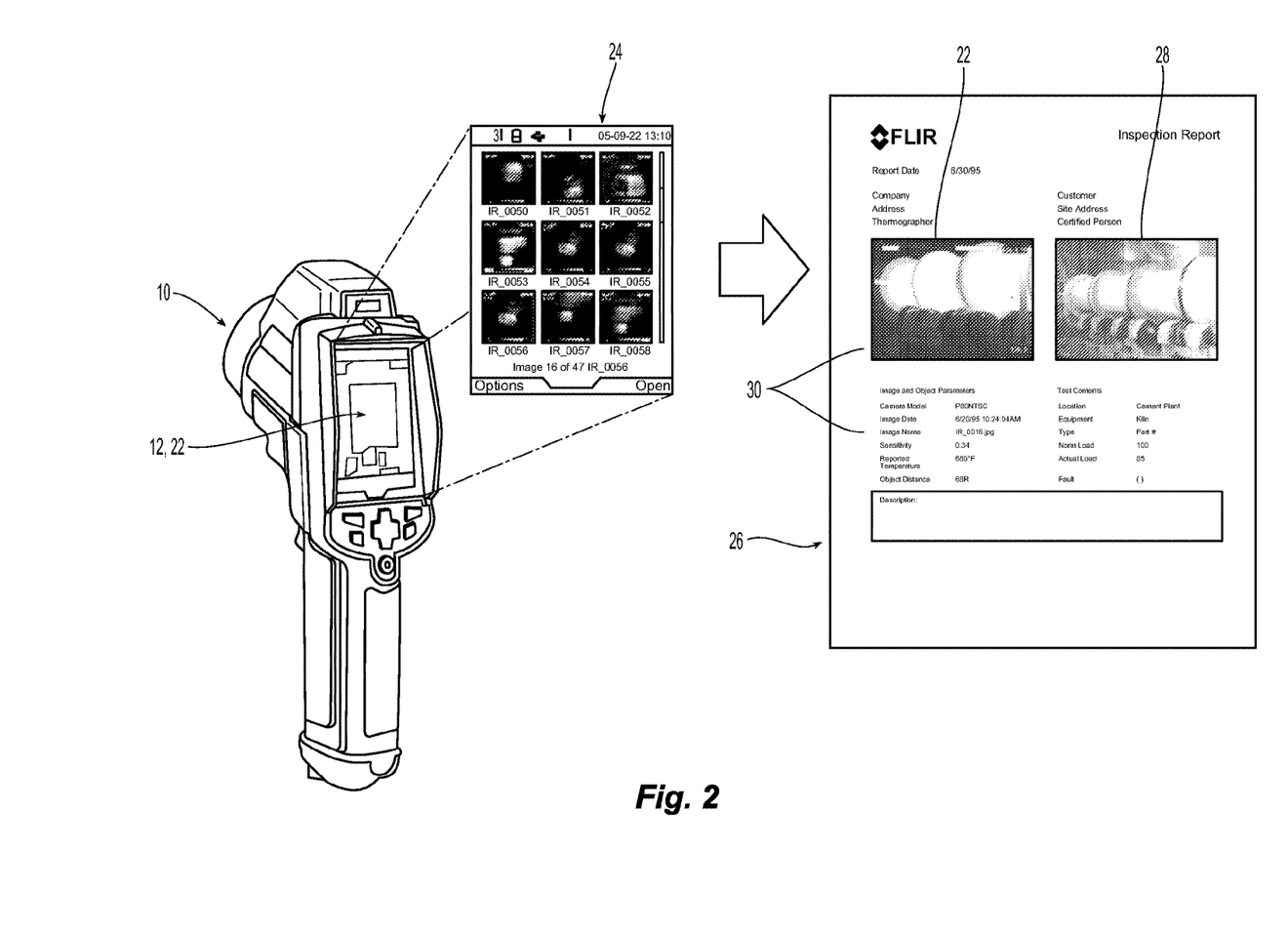
FIG. 2 is an exploded view of the camera of FIG. 1 with an exemplary report prepared on-board in accordance with the present invention.

Referring to FIGS. 1 and 2, an existing IR camera 10 has been modified or upgraded to include the ability to produce thermography reports on-board. Camera 10 resembles an i-Series camera manufactured by FLIR Systems, Inc. having offices in North Billerica, Mass., USA. However, it is noted that any IR camera manufactured by FLIR or manufactured by any IR camera manufacturers can be modified to include the ability to produce thermography reports on-board. The present invention is not limited to any particular IR camera.

Camera 10 preferably comprises housing 12, control buttons 14, screen 16, shutter 18, lens 20 and handle 22. Preferably, screen 16 is a touch screen so that the thermographer or camera operator may select options or input data/comments directly on the screen. IR sensors to capture thermal images and CCD or CMOS visual image sensors are contained within housing 12. A processor to process and store thermal and visual images and other parametric measurements is also contained within housing 12. Camera 10 operates in a similar manner to other commercial IR cameras, except that it is capable of preparing thermography reports on-board in standard file formats, as described herewithin.

Generally, in addition to capturing thermal IR and visual images of the thermal scene, camera 10 may also take other measurements relevant to the thermal scene, such as background temperature, air/ambient temperature, emissivity used or measured emissivity of certain objects in the thermal scene, global (GPS) position, date/time, and camera aiming direction, etc. Camera 10 may also include or adapted to receive signals from other measurement devices, such as a clamp meter to measure current through electrical cables, moisture meter, anemometer, etc. Information and data from these devices can also be included in the report generated by camera 10.

Referring to FIG. 2, screen 16 of camera 10 shows an exemplary thermal IR image 22. When preparing the report, the thermographer may elect to display thumbnails 24 of stored thermal images 22 or visual images, and can readily scroll through the stored images to select the ones to be included in report 26. Report 26 may include thermal IR image 22, visual image 28 and data 30 discussed in the preceding paragraph.

Figure 3:
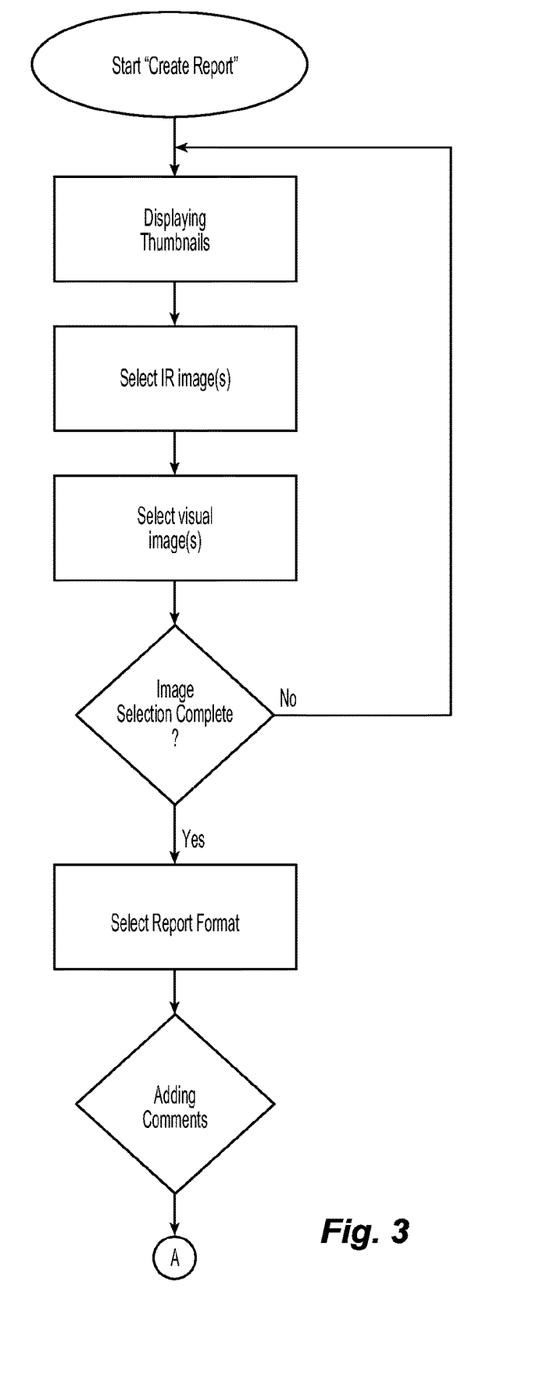
FIG. 3 is a representative flow chart of an exemplary method for carrying out the present invention.

FIG. 3 illustrates a flowchart showing an exemplary method for preparing report 26 by camera 10. To start, the thermographer selects to create the report by pushing one of buttons 14 or select a menu item on touch screen 16. The stored thermal IR images and/or visual images are then displayed for selection. As discussed above, the images can be optionally displayed as thumbnail images. The thermographer may select as many images as necessary to prepare report 26. Camera 10 may ask the thermographer when the image selection is completed and then guides the thermographer to select the report format.

Figure 4A:
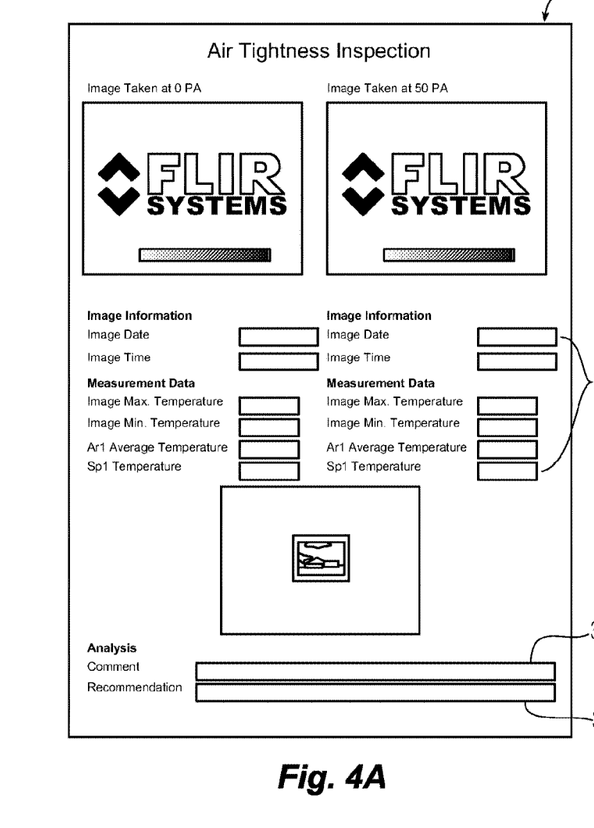
FIGS. 4(a)-4(b) are exemplary reports prepared on-board the inventive camera.
Figure 4B:
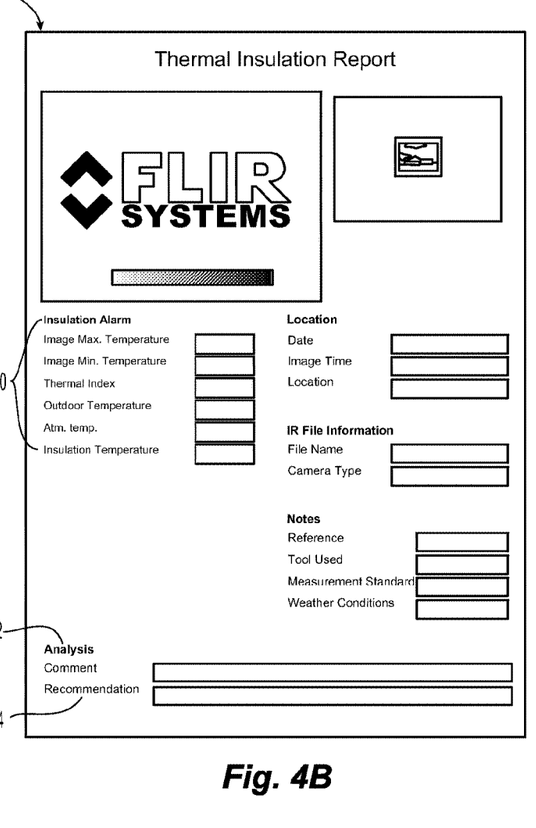

In accordance with another aspect of the present invention, camera 10 comprises a number of report formats that are preloaded onto the camera's processor. The report may have any format that is useful to the thermographer or the customer. One exemplary report is report 26 shown in FIG. 2, entitled "Inspection Report," which comprises, but is not limited to, IR thermal image 22, visual image 28 and data 30. Another exemplary report format is shown in FIG. 4(a), entitled "Air Tightness Inspection" and may include one or more IR thermal images 22, one or more visual images 28 and data 30. Additionally, report 26 may also include comments 32 and recommendations 34, discussed below. Another exemplary report entitled "Thermal Insulation Report" is shown in FIG. 4(b).

In accordance with another aspect of the present invention, camera 10 is capable of generate individualized reports on-board by allowing the thermographer to select the layout of the report and the locations for the images on the report, as well as the specific data, comments or recommendations to be displayed. The processor of camera 10 may use the touch screen to walk the thermographer through a series of options and record the thermographer's selections before arranging the selections to create an individualized report.

Figure 5:
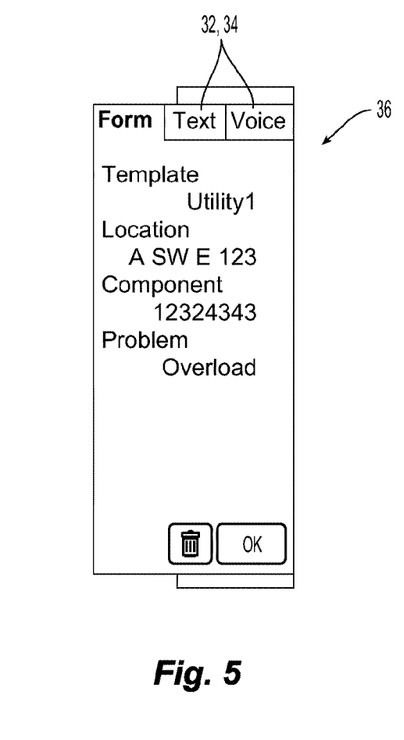
FIG. 5 is a representative graphical user interface (GUI) for adding comments to the report.

Returning to FIG. 3 and referring to FIG. 5, after the report format is selected the thermographer has an opportunity to add value to the report by providing comments on the report. Comments can be text, voice and/or visual. Text comments can be added by the thermographer selecting preselected comments or by entering individualized comments from touch screen 16. Touch screen 16 may display a full alphanumeric keyboard, or a numeric keyboard where each number button corresponds to a group of unique letters similar to the buttons on digital telephones. Text comments may be included directly on report 26 in field 32 or 34, as shown in FIGS. 4(a) and 4(b), or can be stored in a text file associated with report 26 and hyperlinked to report 26. When hyperlinked, text comments may be displayed within a bubble superimposed on report 26, or may be displayed on a separate window.

Voice comments can be recorded by the thermographer or another person using a microphone of camera 10, and preferably the microphone is the one associated with the visual camera. Visual or graphical comments can also be recorded by the thermographer or another person using the visual camera of camera 10. Voice and visual/graphical comments can be stored as standard file format voice or visual files, which are hyperlinked to report 26. Standard voice file formats include, but are not limited to MP3, SMF or MIDI, AIFC, etc. Standard visual file formats include, but are not limited to AVI, MOV (Quicktime), MPEG, RMF, SWF, WMV (Windows Media), etc. Other suitable standard voice or graphic file formats are listed on-line at http://www.magicdb.org/stdfiles.html, which has been incorporated by reference above in its entirety. When hyperlinked, voice comments may be played back while viewing report 26 and visual/graphical comments may be played back in a separate window or as a pop-up window.

As discussed above, hand written or hand drawn comments via a stylus on touch screen 16, which are currently available on certain FLIR IR cameras, can also be added to report 26.

Figure 6A:
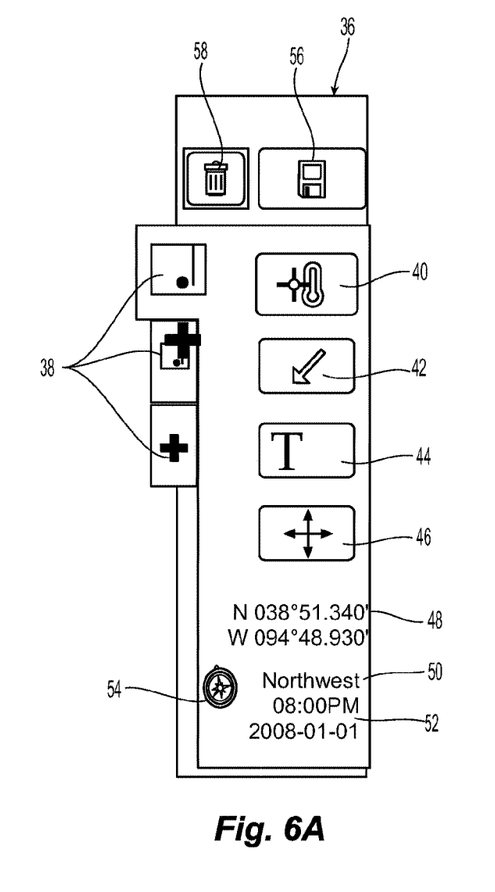
FIGS. 6(a)-6(c) are representative GUIs for enhancing or editing the report usable with the present invention.
Figure 6B:
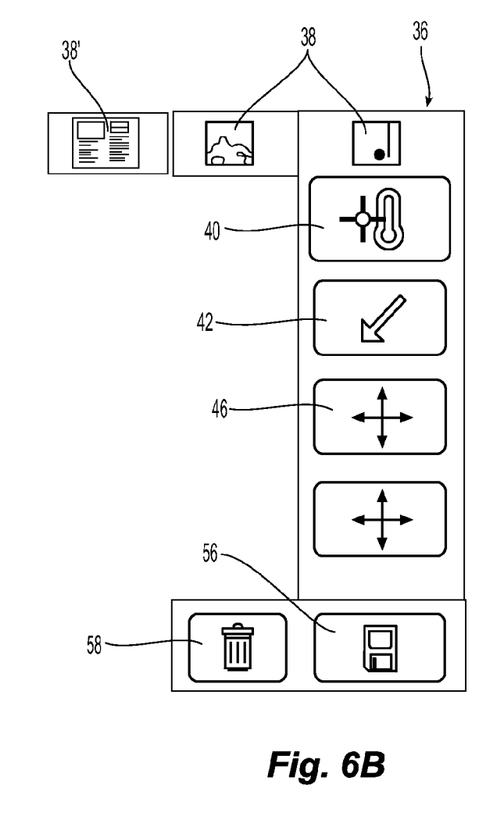

In accordance with another aspect on the present invention, camera 10 may also present the thermographer with options to enhance or embellish report 26. Camera 10 allows the thermographer to preview report 26 on screen 16 and presents the thermographer with a graphical user interface (GUI) 36 to edit report 26. GUI 36 shown in FIG. 6(a) comprises three side tabs 38 including a tab for the thermal IR image and a tab for the visual image, and each tab 38 has a number of functions associated therewith. For example, as shown top tab 38 for the thermal IR image has temperature scale button 40, button 42 to add lines and arrows, text button 44, or expand/contract button 46. Additionally, GPS coordinates 48, direction 50 and date/time 52 can be displayed, and added to report 26. Virtual compass 54 can also be added to assist the thermographer and added to report 26. Additionally, SAVE button 56 and DISCARD button 58 are available for the thermographer. It is noted that the tabs and buttons shown in FIG. 6(a) can be arranged in any format and located at any position, as illustrated in FIG. 6(b). Furthermore, tabs 38 can be shown on top, and in addition to the tabs for enhancing the thermal and visual images, tab 38' is provided for previewing and/or editing report 26 on screen 16.

Figure 6C:
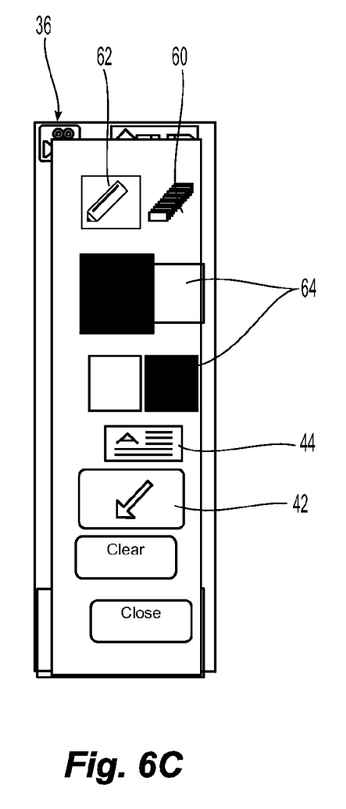

GUI 36, shown in FIG. 6(c), also gives the thermographer the ability to erase through button 60 or add free forming linear or curvilinear lines through button 62, and colors through buttons 64

After comments are added as shown in FIG. 3 and after optional edits and enhancements are added through the various GUIs as discussed above, camera 10 may finalize report 26 in standard file formats, e.g., PDF or JPEG, inter alia, and is output wirelessly or through a USB connection to one or more receivers such as a smart phone, a memory device or a computer, as discussed above.

While it is apparent that the illustrative embodiments of the invention disclosed herein fulfill the objectives stated above, it is appreciated that numerous modifications and other embodiments may be devised by those skilled in the art. Features and/or elements from one embodiment may be used with other embodiments. Therefore, it will be understood that the present invention is intended to cover all such modifications and embodiments, which would come within the spirit and scope of embodiments of the present invention.

We claim:

1. A method for preparing a thermography report on-board an infrared camera, the method comprising:
   capturing at least one infrared image and at least one visual image by the infrared camera;
   preparing, by a built-in processor within the infrared camera, the thermography report including the at least one infrared image and the at least one visual image based on at least one report template stored within the infrared camera;
   presenting, by a built-in graphical user interface of the infrared camera, a first tab selectable by a user to access edit functions for the at least one infrared image and a second tab selectable by the user to access edit functions for the at least one visual image, wherein the edit functions for the at least one infrared image includes at least one edit function different from the edit functions for the at least one visual image;
   editing the at least one infrared image and the at least one visual image included in the thermography report on-board the infrared camera based on user instructions received via the built-in graphical user interface of the infrared camera; and
   storing, by and within the infrared camera, the thermography report in a standard file format, wherein the standard file format is substantially universally readable by personal computing devices.

2. The method of claim 1, further comprising transmitting the thermography report to a receiving device, wherein the receiving device comprises a personal computing device or a printing device.

3. The method of claim 1, wherein the infrared camera comprises an infrared sensor adapted to capture thermal infrared images.

4. The method of claim 1, wherein the infrared camera comprises a visual sensor adapted to capture visual images.

5. The method of claim 1, wherein the template comprises a pre-selected or a standard template.

6. The method of claim 1, wherein the template is definable by a user operating the infrared camera.

7. The method of claim 6, further comprising presenting user-selectable options to the user and preparing the template based on user-selected options.

8. The method of claim 1, wherein the thermography report further comprises a text, voice, visual or graphic file.

9. The method of claim 8, wherein the text, voice, visual or graphic file is hyperlinked to the thermography report.

10. The method of claim 8, wherein the text, voice, visual or graphic file comprises a format that is substantially universally readable by personal computing devices.

11. The method of claim 1, wherein the thermography report comprises parametric information.

12. The method of claim 1, wherein the editing the thermography report comprises changing at least one of a layout of the thermography report and a position of the at least one infrared image in the thermography report.

13. The method of claim 1, wherein the editing the thermography report comprises receiving the user instructions for editing the thermography report via the built in graphical user interface.

14. The method of claim 2, wherein the transmitting the thermography report comprises transmitting using at least one of a wired connection and a wireless connection.

15. A camera comprising:
   a housing;
   an infrared sensor, within the housing, adapted to capture a thermal image of a scene;
   a visual image sensor, within the housing, adapted to capture a visual image of at least a portion of the scene;
   a built-in graphical user interface, within the housing, configured to receive user instructions;
   a built-in processor, within the housing, in communication with the infrared sensor and the visual image sensor, wherein the built-in processor is adapted to:
      prepare a thermography report comprising the thermal image and the visual image, wherein the thermography report is in a standard file format substantially universally readable by personal computing devices;
      present, via the built-in graphical user interface, a first tab selectable by a user to access edit functions for the thermal image and a second tab selectable by the user to access edit functions for the visual image, wherein the edit functions for the thermal image includes at least one edit function different from the edit functions for the visual image;
      edit the thermal image and the visual image included in the thermography report based on user instructions received via the built-in graphical user interface of the camera; and
      form a connection with a receiving device to transmit the thermography report to the receiving device.

16. A camera comprising:
   a housing;
   an infrared sensor adapted to capture a thermal image of a scene;
   a visual image sensor adapted to capture a visual image of at least a portion of the scene;
   means for preparing a report comprising the thermal image and the visual image, wherein the report is in a standard file format substantially universally readable by personal computing devices;
   means for presenting, via the built-in graphical user interface, a first tab selectable by a user to access edit functions for the thermal image and a second tab selectable by the user to access edit functions for the visual image, wherein the edit functions for the thermal image includes at least one edit function different from the edit functions for the visual image;
   means for editing the thermal image and the visual image included in the report based on user instructions received via the built-in graphical user interface of the camera; and
   means for forming a connection with a receiving device to transmit the report to the receiving device, wherein the infrared camera, the preparing means, and the editing means are within the housing of the camera.

17. The camera of claim 16, wherein the edit functions for the thermal image comprise one or more of a temperature scale function, an add-lines-and-arrows function, a text function, and a expand/contract function.

18. The camera of claim 16, wherein the connection comprises at least one of a wired connection and a wireless connection.

19. The camera of claim 16, wherein the report further comprises at least one of a text file, a voice file, and a visual file, and wherein the at least one of the text file, the voice file, and the visual file is in a format substantially universally readable by personal computing devices.

20. The camera of claim 16, further comprising means for including at least one of a background temperature, an air temperature, an ambient temperature, an emissivity, a position, a date, a time, a camera aiming direction, a clamp-meter measurement, a moisture meter measurement, an anemometer measurement, and other parametric information in the report.

* * * * *